United States Patent
Weiher et al.

(10) Patent No.: US 7,889,474 B2
(45) Date of Patent: Feb. 15, 2011

(54) MANUALLY-CONTROLLED ARC FLASH ENERGY REDUCTION SYSTEM AND METHOD FOR CIRCUIT BREAKER TRIP UNITS

(75) Inventors: Helmut Weiher, Burton, OH (US); Richard C. Fleischer, South Euclid, OH (US); Jeffrey W. Patterson, Oberlin, OH (US)

(73) Assignee: Utility Relay Co., Ltd., Chagrin Falls, OH (US)

( * ) Notice: Subject to any disclaimer, the term of this patent is extended or adjusted under 35 U.S.C. 154(b) by 0 days.

(21) Appl. No.: 12/614,502

(22) Filed: Nov. 9, 2009

(65) Prior Publication Data

US 2010/0053833 A1    Mar. 4, 2010

Related U.S. Application Data

(63) Continuation of application No. 11/683,291, filed on Mar. 7, 2007, now Pat. No. 7,646,575.

(60) Provisional application No. 60/780,739, filed on Mar. 9, 2006.

(51) Int. Cl.
  *H02H 3/00*  (2006.01)
  *H02H 9/08*  (2006.01)
(52) U.S. Cl. .......................... 361/96; 361/42
(58) Field of Classification Search .................... 361/96, 361/42
  See application file for complete search history.

(56) References Cited

U.S. PATENT DOCUMENTS

| | | |
|---|---|---|
| 4,266,259 A | 5/1981 | Howell |
| 4,468,714 A | 8/1984 | Russell |
| 4,866,557 A | 9/1989 | Fitts et al. |

(Continued)

FOREIGN PATENT DOCUMENTS

WO    93/12566 A1    6/1993

OTHER PUBLICATIONS

Eaton Corporation, "Arcflash Reduction Maintenance Switch", May 2005, Moon Township, PA, USA.

(Continued)

*Primary Examiner*—Jared Fureman
*Assistant Examiner*—Lucy Thomas
(74) *Attorney, Agent, or Firm*—Pearne & Gordon LLP

(57) ABSTRACT

A circuit protection system includes a normal mode and a maintenance mode. A current sensor senses current in the circuit. An enclosure includes an access panel that is movable between a closed position and open position. A circuit breaker is mounted within the enclosure. An electronic trip unit is in communication with the current sensor and controls interruptions of the current by the circuit breaker based on a trip setting. An interface device is accessible when said access panel is closed and allows selections of the normal and maintenance modes. A display, which is in communication with both of the user interface device and the electronic trip unit, monitors the interface device and transmits data to the trip unit that is based on the selected mode. The display receives data from the trip unit and displays information based on the received data. The display is viewable when the access panel is closed. The trip unit changes the trip setting when said maintenance mode is selected to reduce potential arc flash energy.

8 Claims, 2 Drawing Sheets

U.S. PATENT DOCUMENTS

| | | |
|---|---|---|
| 4,996,646 A | 2/1991 | Farrington |
| 5,113,043 A | 5/1992 | Morris |
| 6,175,479 B1 | 1/2001 | Boyd et al. |
| 6,212,049 B1 | 4/2001 | Spencer et al. |
| 6,252,365 B1 | 6/2001 | Morris et al. |
| 6,297,939 B1 | 10/2001 | Bilac et al. |
| 6,313,975 B1 | 11/2001 | Dunne et al. |
| 6,356,422 B1 | 3/2002 | Bilac et al. |
| 2003/0231440 A1 | 12/2003 | Papallo et al. |
| 2005/0219775 A1 | 10/2005 | Shipp et al. |

OTHER PUBLICATIONS

Chet Davis, P.E., et al., "Practical Solution Guide to Arc Flash Hazards", 2003, Esa, Inc.

Siemens Energy & Automation, Inc., WL "Circuit Breakers Modernize Traditional Arc Flash Protection Techniques", 2004, Alpharetta, GA, USA.

Square D Company, "Arc Flash Protection with Masterpact NW and NT Circuit Breakers", 2003, Cedar Rapids, IA, USA.

International Search Report dated Nov. 9, 2007.

MANUALLY-CONTROLLED ARC FLASH ENERGY REDUCTION SYSTEM AND METHOD FOR CIRCUIT BREAKER TRIP UNITS

CROSS-REFERENCE TO RELATED APPLICATIONS

This application is a continuation of U.S. patent application Ser. No. 11/683,291, filed Mar. 7, 2007, which claims the benefit of U.S. Provisional Application No. 60/780,739, filed Mar. 9, 2006. The disclosure of both U.S. patent application Ser. No. 11/683,291, filed Mar. 7, 2007, and U.S. Provisional Application No. 60/780,739, filed Mar. 9, 2006, are incorporated herein by reference.

BACKGROUND OF THE INVENTION

1. Field of the Invention

The present invention relates to electrical overcurrent protection devices, particularly electronic trip circuit breakers having a manually-controlled arc flash energy reduction system.

2. Description of Related Art

Overcurrent protection devices (OPDs) are used in electrical distribution systems to protect electrical conductors and equipment against the effects of short circuits, ground faults, and/or overloads (hereinafter "faults"). The OPDs in an electrical distribution system are often selectively coordinated so that the nearest OPD upstream to a fault will open and clear the fault before another further upstream OPD opens. Selective coordination of OPDs limits the number of distribution circuits that are de-energized by the operation of an OPD in response to a fault. However, selective coordination of OPDs may also result in added time delays that could allow more energy to be released during a fault than would have been released had the OPDs not been selectively coordinated.

The OPDs in an electrical distribution system can be circuit breakers having programmable electronic controllers for controlling the OPDs' trip settings. The programmable electronic trip controllers are known as electronic trip units and circuit breakers employing electronic trip units are known as electronic trip circuit breakers. Selective coordination among electronic trip circuit breakers is achieved by appropriately adjusting the trip settings of the electronic trip units.

Electronic trip circuit breakers may accommodate zone selective interlocking (ZSI). In a ZSI system, a communication system exists between an upstream circuit breaker and all circuit breakers immediately downstream from the upstream breaker. A protection "zone" is formed that extends to the line side of the downstream circuit breakers The upstream circuit breaker uses a first set of settings (collectively referred to as a "first trip setting") that provide fast interruption for faults located in its protection zone (i.e., faults occurring between the upstream circuit breaker and a downstream circuit breaker). The upstream circuit breaker uses a second set of settings (collectively referred to as a "second trip setting") for faults located outside of its protection zone (e.g., faults occurring downstream of a downstream circuit breaker). The second trip setting operates more slowly than the first trip setting and is coordinated with a trip setting for the downstream circuit breaker. Because the first trip setting provides a faster interruption than the second trip setting, less energy may be released during a fault that occurs within the upstream circuit breaker's protection zone than a fault occurring outside of the zone.

The second trip setting provides selective coordination with the downstream circuit breakers and, therefore, has added time delays that may allow more energy to be released during a fault that occurs outside of the upstream circuit breaker's protection zone. Selective coordination between upstream and downstream breakers is achieved by adding time delays to the electronic trip unit of the upstream breaker to thereby give the downstream breaker time to interrupt the fault.

In a ZSI system, when a downstream circuit breaker detects a fault, it will send a restraint signal to the upstream circuit breaker. The upstream circuit breaker, upon seeing the restraint signal, will recognize that the fault is outside of its protection zone and begin to time out based on its second trip setting. In a first scenario, if the downstream circuit breaker operates properly, it will trip and clear the fault before the upstream circuit breaker times out. Further, the upstream circuit breaker will determine that the fault has stopped and will stop timing using its second trip setting and, thus, will not trip. In this first scenario, the downstream circuit breaker cleared the fault and minimal distribution lines were affected.

In a second scenario, if the downstream circuit breaker does not operate properly, the second trip setting on the upstream circuit breaker will time out and the upstream breaker will trip and clear the fault. Thus, the upstream circuit breaker acts as a back up circuit breaker to the downstream circuit breaker. In this second scenario, however, all distributions lines downstream from the tripped upstream circuit breaker are de-energized and additional fault energy was released.

In a third scenario, if the upstream circuit breaker detects a fault and does not receive a restraint signal from a downstream circuit breaker, the upstream breaker will recognize that the fault is within its protection zone and use its fast first trip setting, thereby minimizing the energy released during the fault.

One drawback of a ZSI system is that control wiring and conduit must be installed between upstream and downstream circuit breakers, so that restraint signals can be monitored by the upstream circuit breaker.

A fault condition could cause an electrical arc that is harmful to nearby persons or property, due to the incident energy of the arc flash. It would be desirable to limit the duration of such an arc, and, therefore, the incident energy of the arc flash. It would further be desirable to limit the incident energy of an arc flash while also minimizing or eliminating the need to install wiring and conduit between OPDs as required for a ZSI system. One method of limiting the duration of an arc caused by a fault condition is by adjusting the trip settings of an electronic trip circuit breaker to lower and/or faster settings. However, selective coordination may be lost by such an adjustment. It would be desirable to provide an electronic trip circuit breaker having a convenient trip adjustment for temporarily adjusting trip settings to lower and/or faster settings.

BRIEF SUMMARY OF THE INVENTION

In accordance with one aspect, provided is a circuit protection system having a normal mode and a maintenance mode in which potential arc flash energy is reduced. A current sensor senses electrical current in the circuit. An enclosure includes an access panel that is movable between a closed position and open position in which an interior of the enclosure is accessible. A circuit breaker for automatically interrupting electrical current is mounted within the enclosure. An electronic trip unit is in communication with the current sensor and controls automatic interruptions of the electrical current by the circuit breaker based on a trip setting. A user interface device, which is accessible when said access panel is in the closed position, allows user selections of said normal mode and said maintenance mode. A display, which is in communication with both of the user interface device and the electronic trip unit, monitors the interface device and transmits data to the trip unit that are based on the selected mode. The display receives data from the trip unit and displays information based on the received data. The display is viewable when said access panel is in the closed position. The electronic trip unit is adapted to change the trip setting when said maintenance mode is selected such that potential arc flash energy is reduced.

In accordance with another aspect, provided is a circuit protection system having a normal mode and a maintenance mode in which potential arc flash energy is reduced. A current sensor senses electrical current in the circuit. An enclosure includes an access panel that is movable between a closed position, and an open position in which an interior of the enclosure is accessible. A circuit breaker is mounted within the enclosure. The circuit breaker automatically interrupts the electrical current. An electronic trip unit is in communication with the current sensor. The electronic trip unit controls automatic interruptions of the electrical current by the circuit breaker based on a trip setting that includes a ground fault current pickup setting, a normally disabled maintenance mode ground fault current pickup setting, a normally disabled maintenance mode instantaneous current pickup setting, and at least one of a short time current pickup setting and an instantaneous current pickup setting. A display is mounted to the access panel and is viewable when the access panel is in the closed position. The display receives data from the trip unit and displays information based on the received data. A selector switch is mounted to the access panel and is manipulable when the access panel is in the closed position. The selector switch allows user selections of said normal mode and said maintenance mode. The electronic trip unit enables the maintenance mode instantaneous current pickup setting and the maintenance mode ground fault current pickup setting when said maintenance mode is selected so that potential arc flash energy is reduced.

In accordance with another aspect, provided is a method of modifying a circuit protection system. The method includes the steps of providing a current sensor for sensing electrical current in the circuit and providing a circuit breaker for automatically interrupting the electrical current. The circuit breaker is mounted within an enclosure having an access panel that is movable between a closed position and an open position in which an interior of the enclosure is accessible. The circuit breaker includes an electronic trip unit in communication with the current sensor. The method further includes the step of replacing the electronic trip unit with another electronic trip unit having at least the following settings: a long time current pickup setting, a long time delay setting, a short time current pickup setting, a short time delay setting, an instantaneous current pickup setting, a ground fault current pickup setting, a ground fault delay setting, a maintenance mode instantaneous current pickup setting that is normally disabled, and a maintenance mode ground fault current pickup setting that is normally disabled. The method further includes the step of installing a display so that the display is in communication with said another electronic trip unit and is accessible when said access panel is in the closed position. The method further includes the steps of displaying information on the display based on data received from said another electronic trip unit, and installing a selector switch for allowing user selections of a normal mode and a maintenance mode. The selector switch is installed so as to be accessible when said access panel is in the closed position. The method further includes the step of enabling the maintenance mode instantaneous current pickup setting and the maintenance mode ground fault current setting whenever the maintenance mode is selected.

DETAILED DESCRIPTION OF EXAMPLE EMBODIMENTS

An arc flash during a fault could harm nearby persons and/or property. Such harm could be mitigated by reducing the potential arc flash energy of the arc flash.

One equation for determining potential arc flash in a cubic box is:

$$E = 1038.7 \times D^{-1.4738} \times t \times (0.0093 \times F^2 - 0.3453 \times F + 5.9675)$$

where E is the energy level in cal/cm$^2$ in a box not larger than 20 inches, D is the distance from an electrode in inches (for distances of 18 inches and greater), t is the arc duration in seconds, and F is available fault current in kA (for the range of 15 to 50 kA). From the above equation, it can be seen that at a given distance, potential arc flash energy can be reduced by shortening the duration of the arc.

Figure 1:
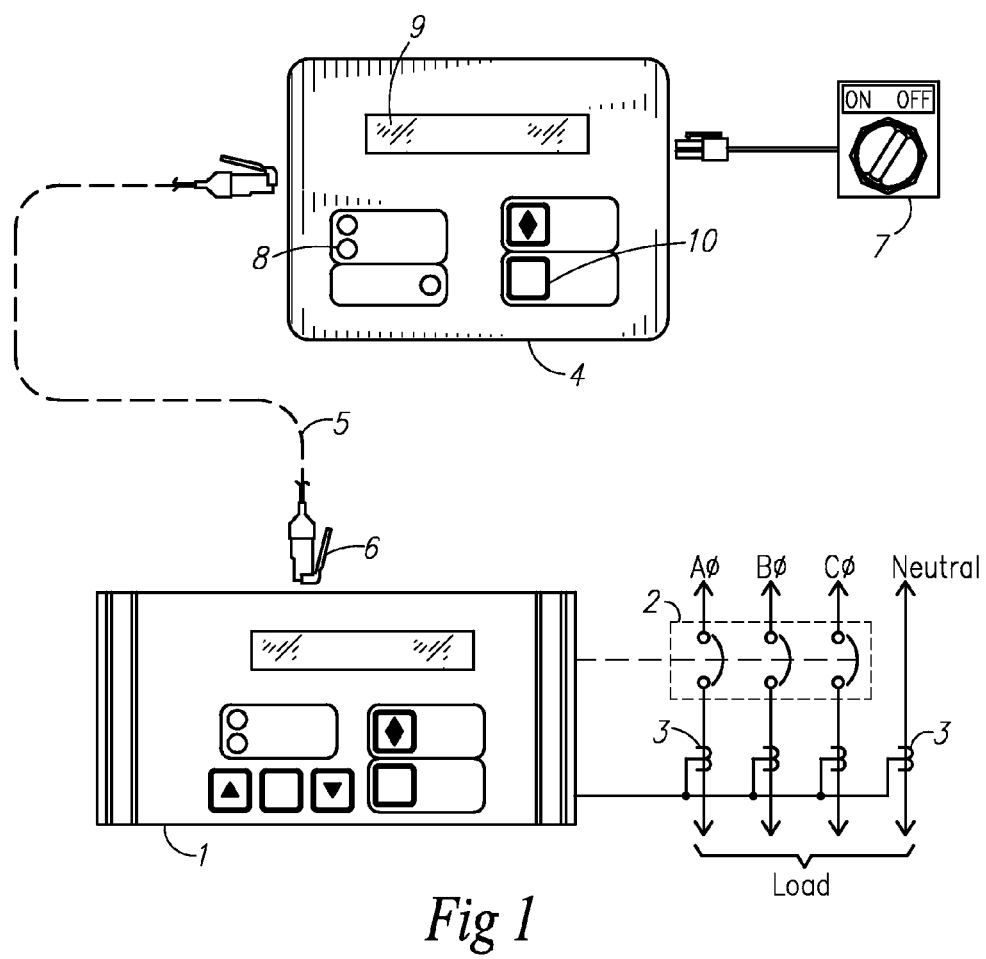
FIG. 1 is a schematic diagram of a circuit breaker electronic trip unit having a manually-controlled arc flash energy reduction system.

FIG. 1 provides a schematic diagram of a circuit breaker electronic trip unit 1 having a manually-controlled arc flash energy reduction system. The electronic trip unit 1 is operatively connected to the operating mechanism of a circuit breaker 2, for example, a three-pole circuit breaker. The trip unit 1 is also operatively connected to a plurality of current sensors 3, for example, current transformers (CTs). The electronic trip unit 1 controls the circuit breaker's 2 operating mechanism based on a plurality of settings (collectively referred to as a "trip setting") and a current level in the circuit that is sensed by the CTs. The trip unit 1 signals the circuit breaker's 2 operating mechanism to open the circuit breaker whenever a fault condition occurs.

The electronic trip unit 1 includes, among other settings, the following settings: a long time current pickup setting, a long time delay setting, a short time current pickup setting, a short time delay setting, an instantaneous current pickup setting, a ground fault current pickup setting, a ground fault delay setting, a maintenance mode instantaneous current pickup setting that is normally disabled, and a maintenance mode ground fault current pickup setting that is normally disabled. Input devices on the trip unit 1 allow a user to program setpoint levels for the various settings.

When the arc flash energy reduction system is disabled, the system is in the "normal mode." In normal mode, the instantaneous current pickup setting and/or the ground fault current pickup setting may be enabled or disabled as desired. For example, selective coordination with downstream circuit breakers may require that the instantaneous current pickup setting be disabled. Further, in normal mode, the maintenance mode instantaneous current pickup setting and the maintenance mode ground fault current pickup setting are disabled. That is, while in normal mode, the electronic trip unit 1 ignores the maintenance mode instantaneous current pickup setting and the maintenance mode ground fault current pickup setting. When the arc flash energy reduction system is enabled, the system is in the "maintenance mode." In maintenance mode, the maintenance mode instantaneous current pickup setting and the maintenance mode ground fault current pickup setting are enabled, and, therefore, not ignored by the electronic trip unit. In an embodiment, when the maintenance mode instantaneous current pickup setting and the maintenance mode ground fault current pickup setting are enabled, they operate in addition to the instantaneous current pickup setting and the ground fault current pickup setting, which remain enabled if enabled in normal mode. In another embodiment, when the maintenance mode instantaneous current pickup setting and the maintenance mode ground fault current pickup setting are enabled, they operate as an alternative to the instantaneous current pickup setting and the ground fault current pickup setting, which are disabled in maintenance mode. In an embodiment, when the system is in the maintenance mode, at least one of the short time current pickup setting and the instantaneous current pickup setting are disabled and the maintenance mode instantaneous current pickup setting is enabled.

The maintenance mode instantaneous current pickup setting provides a faster tripping of the circuit breaker 2 than the short time current pickup setting and can provide a faster tripping than the instantaneous current pickup setting. Similarly, the maintenance mode ground fault current pickup setting provides a faster tripping of the circuit breaker 2 than the ground fault current pickup setting. Accordingly, when in maintenance mode, the circuit breaker 2 can clear a fault more quickly than in normal mode. In maintenance mode, the potential arc flash energy due to a fault is reduced, and maintenance can be performed more safely on energized equipment downstream from the circuit breaker 2.

When in maintenance mode, the circuit breaker 1 behaves like a ZSI circuit breaker that fails to receive a restraint signal and responds quickly to a fault. By responding quickly to a fault, incident arc flash energy is reduced. However, maintenance mode may not provide selective coordination of OPDs. In normal mode, selective coordination in the electrical distribution system is preserved.

The electronic trip unit 1 is connected to a display 4. The connection between the trip unit 1 and display 4 could be through a hardwired or wireless connection and provides a communications transmission path between the trip unit 1 and display 4. FIG. 1 shows the electronic trip unit 1 and display 4 connected by a cable 5. The cable includes a plug 6 at either end for plugging into communication port jacks on the trip unit 1 and display 4. The plugs 6 provide a readily removable connection between the trip unit 1 and display 4.

The display 4 communicates with the trip unit 1. The display 4 receives data from the trip unit and displays messages based on the data. For example, the display 4 could display various circuit breaker settings, present current level in the circuit, historical trip data, and the like.

The display 4 can include a battery system for powering the display 4. Alternatively, the display 4 can be powered through its interconnection with the trip unit 1. For example, both of the trip unit 1 and the display 4 can be powered by the CTs 3. The display 2 can also be powered from a power source local to the display 4.

A user interface device, such as a selector switch 7, is connected to the display 4. The display 4 monitors the position or state of the selector switch 7 and communicates the state of the selector switch 7 to the trip unit 1. The selector switch 7 would typically be mounted near the display 4. Because the selector switch 7 is connected directly to the display 4, and not the trip unit 1, a single cable 5, such as a ribbon cable, can be run between the trip unit 1 and display/selector switch location. Furthermore, the cable 5 can be readily disconnected from the trip unit 1 by removal of either plug 6, which facilitates removal of the circuit breaker 2 and/or the trip unit 1 for maintenance, replacement, etc.

The selector switch 7 can be a two-position selector switch having an ON position and an OFF position, for manually enabling and disabling the arc flash energy reduction system. The selector switch 7 can be locked in the ON or OFF position. For example, the selector switch 7 can include an operating handle or switch cover that accommodates a padlock, or the selector switch can have an integral key locking mechanism. The selector switch 7 can also be compatible with standard lockout/tagout devices. In an embodiment, the selector switch 7 includes a plurality of normally closed and/or normally open auxiliary contacts for monitoring by and/or interlocking with various other devices. The selector switch 7 can alternatively be formed from a variety of known switches, such as a pushbutton switch, a membrane switch, or a touch-screen interface device, for example.

The display 4 includes an electronic controller, for example, a microprocessor or microcontroller, and is configured to communicate with the trip unit 1, which also includes an electronic controller. The display 4 further includes indicating lights, for example, LED indicating lights 8, and an alphanumeric/graphical display system, for example, a liquid crystal display (LCD) 9. Through the indicating lights and the alphanumeric/graphical display system, the display 4 can provide information to a user regarding various circuit breaker settings, present current level in the circuit, historical trip data, information about the display 4 itself, and/or the position of the selector switch 7. For example, indicating lights can be provided to indicate that the display 4 is working properly, the existence of an overcurrent condition, or that the selector switch 7 is in the ON or OFF position.

The display 4 can be configured to display the following information on the LCD 9: CT rating, long time current pickup setting, long time delay setting, short time current pickup setting, short time delay setting, short time $I^2T$, instantaneous current pickup setting, ground fault current pickup setting, ground fault delay setting, ground fault $I^2T$, phase unbalance current pickup setting, phase unbalance delay setting, maintenance mode ground fault current pickup setting, maintenance mode instantaneous pickup setting, last trip data, ground fault >2 times CT rating, phase unbalance percentage, historical trip data, low current condition, overload condition, phase A, B, and C currents, ground fault current, and line-to-line and line-to-neutral voltages. A button 10 is provided on the display 4 for selecting the information to be displayed on the LCD 9. For example, a user can sequentially toggle among the information that can be displayed on the LCD 9 by repeatedly pressing the button 10. The display's 4 electronic controller monitors the button 10 and causes information to be displayed on the LCD 9 in response to user selections. In an embodiment, various settings of the trip unit 1, for example the trip setting, can be set at the display 4 and not merely displayed at the display 4. In a further embodiment, the various settings of the trip unit 1 cannot be changed at the display 4, to prevent unauthorized changes.

The display 4 can communicate the position or state of the selector switch 7 to the trip unit 1. A user places the circuit protection system in maintenance mode by moving the selector switch 7 to the ON position. When the selector switch 7 is moved to the ON position, the display 4 sends data to the trip unit 1 to inform the trip unit of the position of the selector switch. In an embodiment, the trip unit 1 responds to the movement of the selector switch 7 to the ON position by enabling the maintenance mode instantaneous current pickup setting and the maintenance mode ground fault current pickup setting for as long as the selector switch 7 is in the ON position. In a further embodiment, the trip unit 1 responds by also disabling the ground fault current pickup setting and disabling at least one of the short time current pickup setting and the instantaneous current pickup setting. In a still further embodiment, the trip unit 1 responds by adjusting the instantaneous current pickup setting and the ground fault current pickup setting based on, for example, the maintenance mode instantaneous current pickup setting and the maintenance mode ground fault current pickup setting. For example, in the maintenance mode, the instantaneous current pickup setting can be replaced with the maintenance mode current pickup setting and the ground fault current pickup setting can be replaced with the maintenance mode ground fault current pickup setting. In a still further embodiment, the trip unit responds to the movement of the selector switch 7 to the ON position by adjusting the ground fault delay setting to a lower setting, such as a minimal delay setting.

A maintenance technician can place the circuit protection system in maintenance mode by placing the selector switch 7 in the ON position. If desired, the maintenance technician can lock the circuit protection system in maintenance mode by placing a padlock onto the switch's operating handle or lockable cover.

In an embodiment, the maintenance mode ground fault current pickup setting ranges from of 20% to 200% of the CT rating, with a maximum of 1200 amps, and is adjustable in 10 amp steps. However, other ranges and/or settings are also possible. In an embodiment, the maintenance mode ground fault current pickup setting can be turned off or disabled, so that the electronic trip unit 1 uses no maintenance mode ground fault pickup setting when the selector switch 7 is in the ON position. In an embodiment, the maintenance mode instantaneous pickup setting ranges from 150% to 1200% of the long time current pickup setting, and is adjustable in 100 amp steps. However, other ranges and/or settings are also possible. By appropriately selecting and setting the maintenance mode ground fault current pickup setting and maintenance mode instantaneous pickup setting, arc flash potential downstream of the circuit breaker 2 can be reduced, due to a reduced breaker clearing time.

Figure 2:
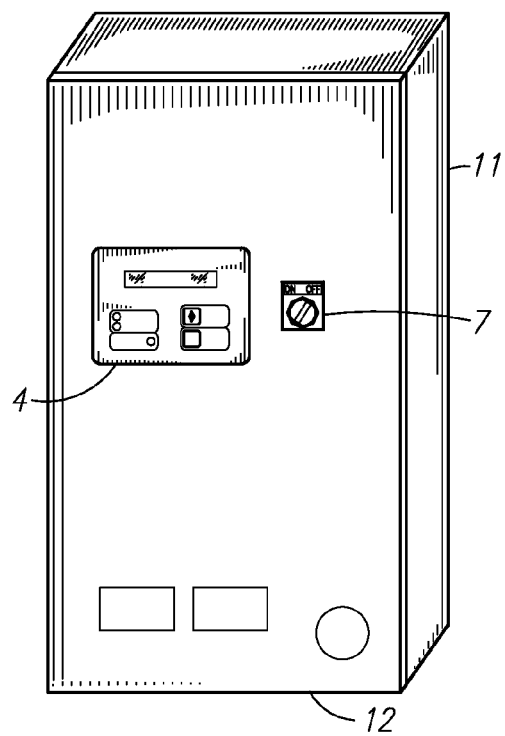
FIG. 2 is an exterior perspective view of an enclosure for a circuit breaker having a manually-controlled arc flash energy reduction system.
Figure 3:
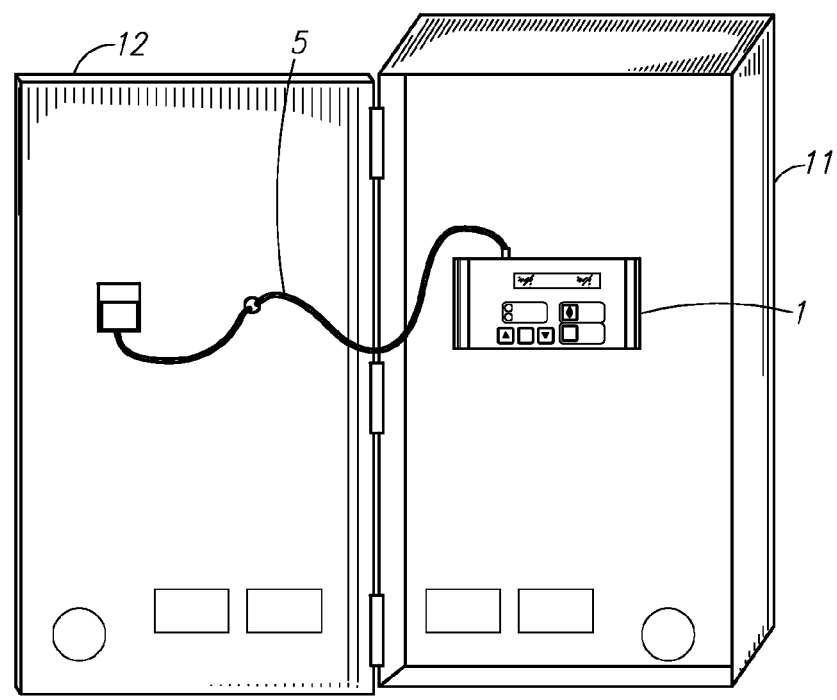
FIG. 3 is an interior perspective view of an enclosure for a circuit breaker having a manually-controlled arc flash energy reduction system.

FIGS. 2 and 3 show an example mounting configuration for the display 4 and selector switch 7. The display 4 and selector switch 7 are mounted to a circuit breaker enclosure 11. More specifically, they are mounted to an access panel, such as a door 12, for the circuit breaker enclosure 11. In FIG. 2, the door 12 is closed, and the display 4 and selector switch 7 are accessible while the door 12 is closed. A maintenance technician can operate the selector switch 7 and view information about the circuit breaker on the display 4 without opening the door 12 and possibly exposing himself to electrically energized parts. In FIG. 3, the door 12 is open and the trip unit 1 is accessible. As discussed above, a single cable 5 connects the trip unit 1 and the display 4.

An existing electrical distribution system can be modified to provide a manually-controlled arc flash energy reduction system as discussed above. For example, an installation may have existing electronic trip circuit breakers in enclosures. However, the existing electronic trip units may not include the maintenance mode instantaneous current pickup setting and the maintenance mode ground fault current pickup setting. These existing electronic trip units can be removed and replaced with electronic trip units having such settings. Mounting holes for the display and selector switch can be drilled or punched out of the access panel of the circuit breaker enclosure. The display and selector switch can then be mounted to the access panel, the selector switch wired to the display, and a cable run between the display and new electronic trip unit.

In an embodiment, the trip unit 1 does not include the maintenance mode ground fault current pickup setting and the maintenance mode instantaneous current pickup setting, and the display 4 and/or trip unit 1 automatically adjusts the ground fault current pickup setting and the instantaneous current pickup setting whenever the selector switch 7 is moved to the ON position.

In an embodiment, normal mode and maintenance mode settings are stored in a memory portion of the display 4. As the selector switch 7 is moved between the ON and OFF positions, the display 4 communicates the appropriate settings to the trip unit 1, overwriting a prior settings stored within the trip unit 1. In this embodiment, the display 4 acts as a remote programmer for the trip unit 1. In an embodiment, the display 4 downloads and saves the trip unit's 1 normal mode settings in response to the selector switch 7 being moved to the ON position. The display 4 then communicates the position of the selector switch 7 to the trip unit 1 and/or overwrites the trip unit's 1 normal mode settings with maintenance mode settings. When the selector switch is moved to the OFF position, the display 2 communicates this to the trip unit 1 and/or overwrites the maintenance mode settings with the previously downloaded and saved normal mode settings.

In an embodiment, the electronic trip unit 1 and the display 4 can communicate with other devices, such as a programmable controller, for example, a programmable logic controller, a remote terminal unit, or a human-machine interface device.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A circuit protection system, having a normal mode, and a maintenance mode in which potential arc flash energy is reduced, comprising:
    a current sensor for sensing electrical current in the circuit;
    an enclosure having an access panel that is movable between a closed position and open position in which an interior of the enclosure is accessible;
    a circuit breaker, mounted within the enclosure, for automatically interrupting the electrical current;
    an electronic trip unit in communication with the current sensor for controlling automatic interruptions of the electrical current by the circuit breaker based on a trip setting;
    a user interface device, which is accessible when said access panel is in the closed position, that allows user selections of said normal mode and said maintenance mode; and
    wherein when the maintenance mode is selected using the user interface device, the electronic trip unit changes the trip setting such that potential arc flash energy is reduced, and wherein when said maintenance mode is selected, the electronic trip unit changes the trip setting by enabling both of a maintenance mode instantaneous current pickup setting and a maintenance mode ground fault current pickup setting.

2. The circuit protection system of claim 1, wherein the access panel is a door.

3. The circuit protection system of claim 1, wherein the user interface is a selector switch that is accessible when said access panel is in the closed position and having means for receiving a padlock without opening the access panel.

4. The circuit protection system of claim 1, wherein the electronic trip unit includes:
- a long time current pickup setting;
- a long time delay setting;
- a short time current pickup setting;
- a short time delay setting;
- an instantaneous current pickup setting;
- a ground fault current pickup setting;
- a ground fault delay setting;
- wherein the maintenance mode instantaneous current pickup setting is normally disabled; and
- wherein the maintenance mode ground fault current pickup setting is normally disabled.

5. The circuit protection system of claim 4, wherein when said maintenance mode is selected, the electronic trip unit disables the ground fault current pickup setting and at least one of the short time current pickup setting and the instantaneous current pickup setting.

6. A circuit protection system, having a normal mode, and a maintenance mode in which potential arc flash energy is reduced, comprising:
- a current sensor for sensing electrical current in the circuit;
- an enclosure having an access panel that is movable between a closed position and open position in which an interior of the enclosure is accessible;
- a circuit breaker, mounted within the enclosure, for automatically interrupting the electrical current;
- an electronic trip unit in communication with the current sensor for controlling automatic interruptions of the electrical current by the circuit breaker based on a trip setting; and
- a user interface device, which is accessible when said access panel is in the closed position, that allows user selections of said normal mode and said maintenance mode;
- wherein when said maintenance mode is selected using the user interface device, the electronic trip unit changes the trip setting such that potential arc flash energy is reduced, wherein the electronic trip unit includes:
- an instantaneous current pickup setting;
- a ground fault current pickup setting;
- a maintenance mode instantaneous current pickup setting; and
- a maintenance mode ground fault current pickup setting,
- wherein when said maintenance mode is selected, the electronic trip unit changes the trip setting by replacing the instantaneous current pickup setting with the maintenance mode instantaneous current pickup setting and replacing the ground fault current pickup setting with the maintenance mode ground fault current pickup setting.

7. The circuit protection system of claim 6, wherein the access panel is a door.

8. The circuit protection system of claim 6, wherein the user interface is a selector switch that is accessible when said access panel is in the closed position and having means for receiving a padlock without opening the access panel.

* * * * *

UNITED STATES PATENT AND TRADEMARK OFFICE
CERTIFICATE OF CORRECTION

| | | |
|---|---|---|
| PATENT NO. | : 7,889,474 B2 | |
| APPLICATION NO. | : 12/614502 | |
| DATED | : February 15, 2011 | |
| INVENTOR(S) | : Helmut Weiher et al. | |

It is certified that error appears in the above-identified patent and that said Letters Patent is hereby corrected as shown below:

Cover page, item "Notice" add -- This patent is subject to a terminal disclaimer. --

Column 4, line 29, replace "$E = 1038.7 \times D^{-14738} \times t \times (0.0093 \times F^2 - 0.3453 \times F + 5.9675)$" with -- $E = 1038.7 \times D^{-1.4738} \times t \times (0.0093 \times F^2 - 0.3453 \times F + 5.9675)$ --

Signed and Sealed this
Tenth Day of May, 2011

David J. Kappos
*Director of the United States Patent and Trademark Office*